(12) United States Patent
Wang

(10) Patent No.: US 6,796,842 B1
(45) Date of Patent: Sep. 28, 2004

(54) ELECTRONIC CARD CONNECTOR

(76) Inventor: Ming-Te Wang, No. 3, Lane 560, Chung Cheng Rd., Hsin Tien City, Taipei (TW)

( * ) Notice: Subject to any disclaimer, the term of this patent is extended or adjusted under 35 U.S.C. 154(b) by 0 days.

(21) Appl. No.: 10/680,119

(22) Filed: Oct. 8, 2003

(51) Int. Cl.$^7$ ............................................... H01R 24/00
(52) U.S. Cl. ..................................................... 439/630
(58) Field of Search ................................ 439/630, 260, 439/259, 261, 267, 862, 325; 361/600; 235/441

(56) References Cited

U.S. PATENT DOCUMENTS

| | | | | |
|---|---|---|---|---|
| 5,012,078 A | * | 4/1991 | Pernet | 235/441 |
| 5,091,618 A | * | 2/1992 | Takahashi | 235/441 |
| 5,690,281 A | * | 11/1997 | Ikeya et al. | 439/268 |
| 6,015,311 A | * | 1/2000 | Benjamin et al. | 439/267 |
| 6,021,945 A | * | 2/2000 | Hoolhorst | 235/441 |
| 6,097,589 A | * | 8/2000 | Ito et al. | 361/600 |
| 6,102,723 A | * | 8/2000 | Kusakabe et al. | 439/267 |
| 6,174,186 B1 | * | 1/2001 | Hashiguchi et al. | 439/260 |
| 6,276,941 B1 | * | 8/2001 | Wu | 439/66 |
| 6,398,598 B2 | * | 6/2002 | Masumoto | 439/862 |
| 6,402,036 B1 | * | 6/2002 | Bleier | 235/486 |
| 6,447,338 B1 | * | 9/2002 | Bricaud et al. | 439/630 |
| 6,524,114 B2 | * | 2/2003 | Watanabe et al. | 439/65 |
| 6,695,647 B2 | * | 2/2004 | Tsai | 439/630 |
| 6,700,788 B2 | * | 3/2004 | Matsushita et al. | 361/737 |

FOREIGN PATENT DOCUMENTS

TW         91200027        7/2003

* cited by examiner

Primary Examiner—P. Austin Bradley
Assistant Examiner—Briggitte R. Hammond

(57) ABSTRACT

A connector structure for connecting an electronic card includes an insulated body, a plurality of terminals, a seesawing mount and a resilient element. The insulated body has an opening with a plurality of holes formed on at least one wall of the opening. Each terminal has a contact portion for penetrating through a respective hole on the wall into the opening. The seesawing mount is furnished in the opening with a first end and a second end. The second end of the seesawing mount is located above the contact portions of the terminals. The resilient element has one end mounted on the insulated body and the other end pressing down the second end of the seesawing mount to press down the contact portions of the terminals. Whereby when inserting the electronic card in the insulated body, the electronic card pushes down the first end of the seesawing mount to lift up the second end of the seesawing mount so that the contact portions of the terminals can touch the electronic card.

8 Claims, 4 Drawing Sheets

US 6,796,842 B1

ELECTRONIC CARD CONNECTOR

BACKGROUND OF THE INVENTION

The present invention relates generally to a connector structure and, more particularly, to a connector for connecting an electronic card, having a strengthened and integrated structure to provide a reliable contact and a stable connection with the electronic card.

FIGS. 1 and 2 show a conventional connector structure disclosed in the Taiwan Patent Application No. 91200027. The connector 10a is for connecting an electronic card 30a such as a memory card (e.g. a memory stick and a smart media and etc.) or a SIM card. The connector 10a is mounted on a printed circuit board (PCB) to electrically connect the electronic card 30a to the PCB.

The connector 10a includes an insulated body 11a, a plurality of terminals 12a, a seesawing mount 13a and two springs 14a. The terminals 12a are aligned in two rows, and each row includes multiple (e.g. four) terminals 12a. Each terminal 12a has a soldering portion 15a and a contact portion 16a. The soldering portion 15a is extended out and the contact portion 16a is penetrated into the insulated body 11a.

There are two pivotal holes for receiving the corresponding shafts 17a of the seesawing mount 13a. The first end 18a of the seesawing mount 13a is normally lifted by the springs 14a to have the second end 19a press down the contact portions 16a of the terminals 12a, as shown in FIG. 1. After the electronic card 30a is furnished, as shown in FIG. 2, the first end 18a of the seesawing mount 13a is pushed down and the second end 19a of the seesawing mount 13a is lifted to have the contact portions 16a of the terminals 12a to contact with the electronic card 30a.

The above-mentioned connector 10a is mounted on the PCB by a surface mounting technology (SMT). After the surface of the PCB is coated with the solder and the connector 10a is place thereon, a heating process at a temperature about 180 to 230° C. is provided to adhere the soldering portions 15a of terminals 12a on the PCB.

However, the conventional connector has the drawbacks as follows.

Firstly, the springs 14a are located right beneath the first end 18a of the seesawing mount 13a, an exerting force of the electronic card 30a to push against the first end 18a of the seesawing mount 13a has to be larger than an elastic force of the springs 14a. The front end of the electronic card 30a may be easy to get attrition.

Secondly, as in FIG. 1, both the first end 18a and the second end 19a of the seesawing mount 13a are under the upward force of the springs 14a and the contact portions 16a of the terminals 12a, respectively. The seesawing mount 13a may be easy to get breakdown. Further, the seesawing mount 13a may be damaged due to the deformation and may not be used to provide the reliable seesaw effect after the heating process to mount the connector 10a.

Therefore, there exist inconvenience and drawbacks for practically application of the above conventional connector structure. There is thus a substantial need to provide an improved electronic card connector that resolves the above drawbacks and can be used more conveniently and practically.

BRIEF SUMMARY OF THE INVENTION

The present invention provides an electronic card connector having an improved seesawing mount to provide a reliable contact and stable connection with the electronic card.

The electronic card connector provided by the present invention includes an insulated body, a plurality of terminals, a seesawing mount and a resilient element. The insulated body has an opening with a plurality of holes formed on at least one wall of the opening. Each terminal has a contact portion for penetrating through a respective hole on the wall into the opening. The seesawing mount is furnished in the opening with a first end and a second end. The second end of the seesawing mount is located above the contact portions of the terminals. The resilient element has one end mounted on the insulated body and the other end pressing down the second end of the seesawing mount to press down the contact portions of the terminals.

Therefore, the present invention installs a light emitting diode and a switch on a push handle of a car cigarette lighter, such that when the lighter is conducted, the user or driver can easily observe the conducting status by the light generated by the light emitting diode.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
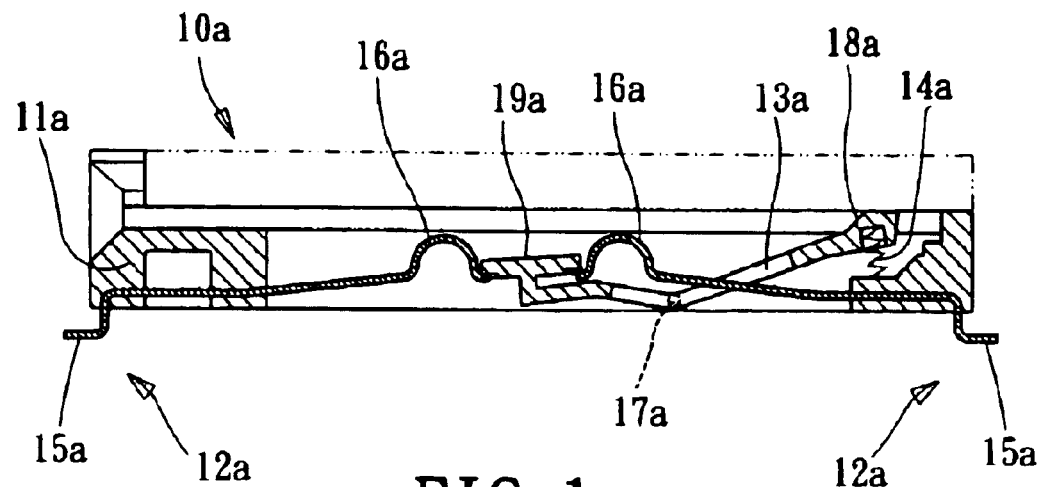
FIG. 1 shows a cross-sectional view of the conventional connector.
Figure 2:
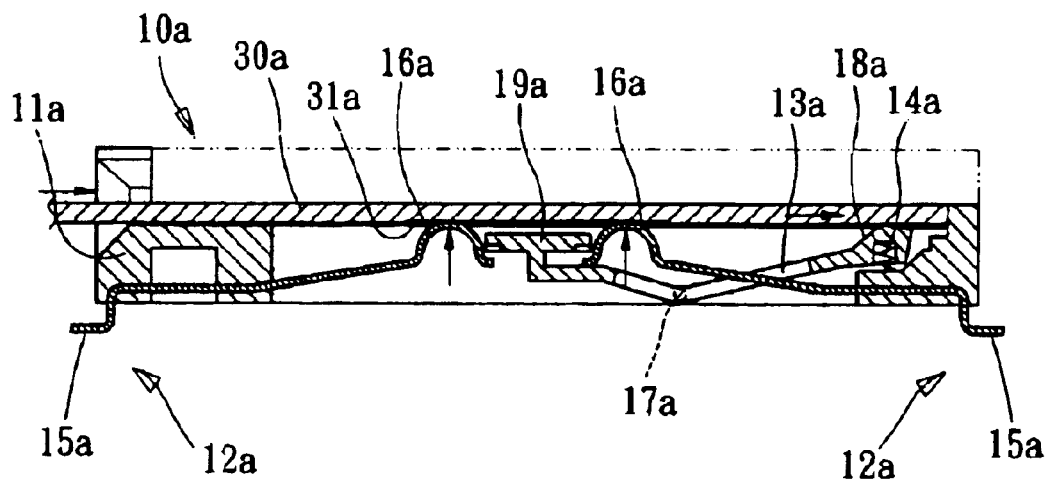
FIG. 2 shows an electronic card is received on the conventional connector of FIG. 1.
Figure 3:
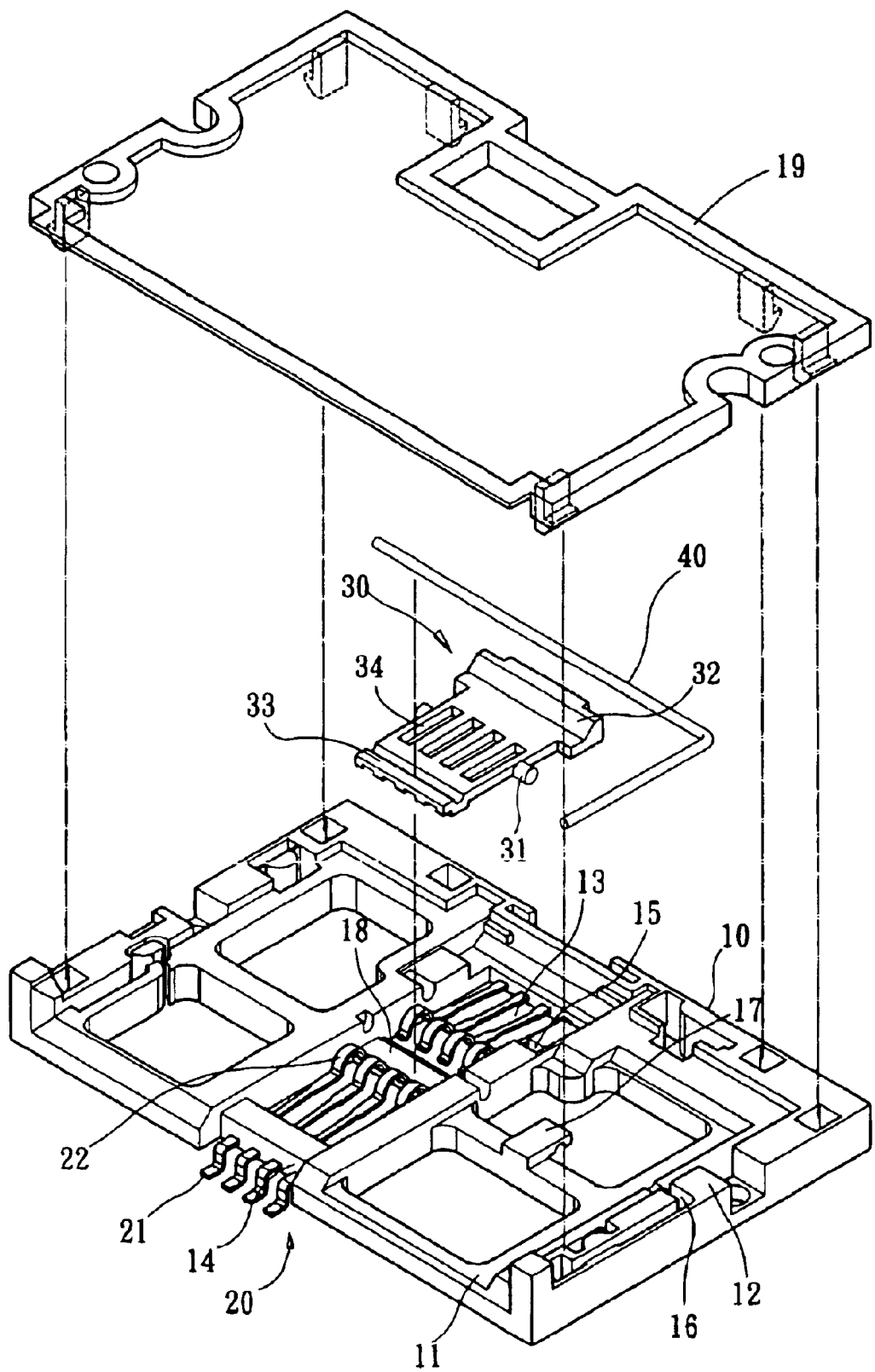
FIG. 3 shows a perspective view of a connector according to the present invention.
Figure 4:
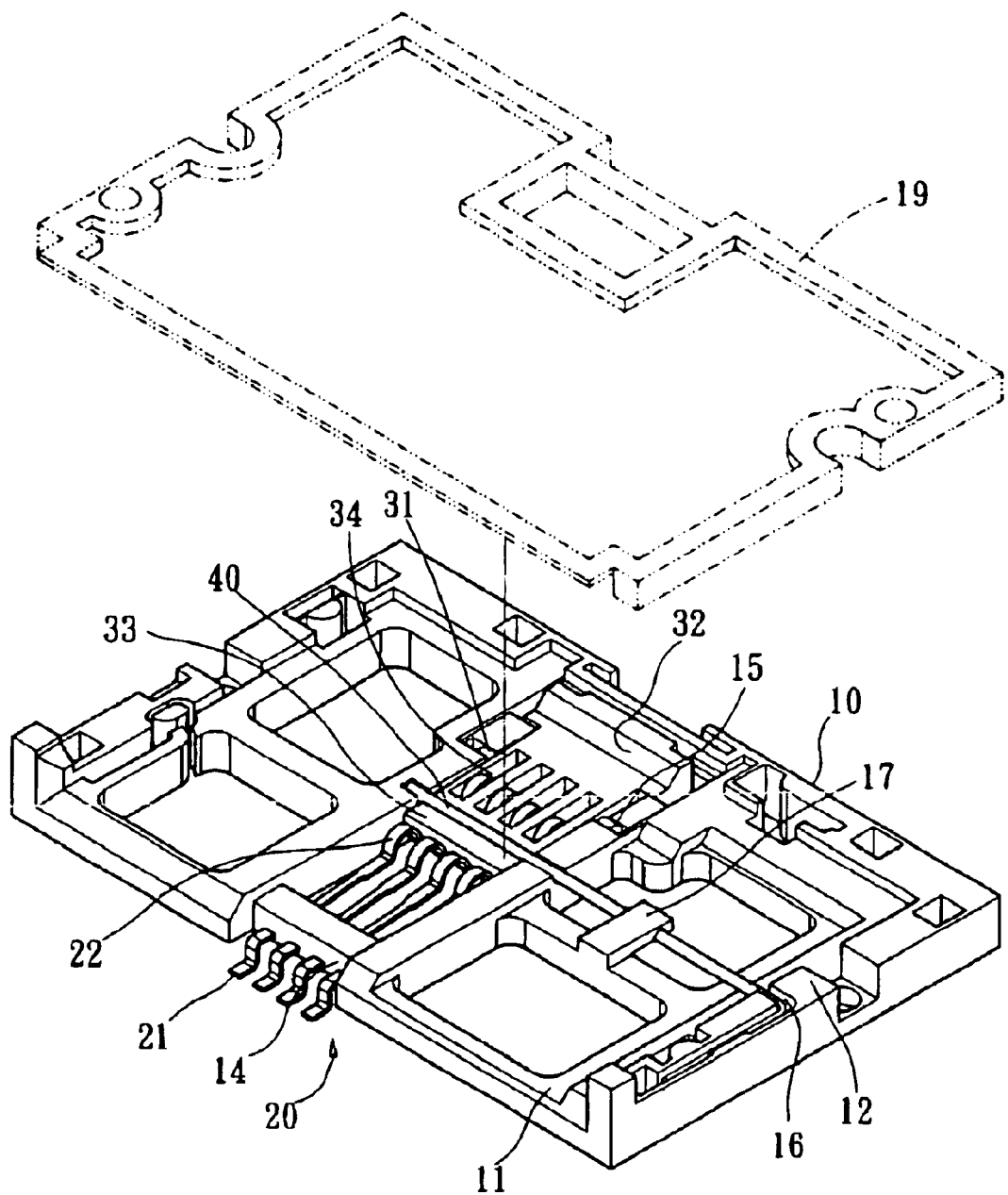
FIG. 4 shows the assembly of the connector according to the present invention.

Referring to FIGS. 3 and 4, a connector structure provided by the present invention includes an insulated body 10, a plurality of terminals 20, a seesawing mount 30 and a resilient element 40.

The flat-type insulated body 10 is made of a plastic material, and includes a slot portion 11 for receiving the electronic card and an edge portion 12 around the slot portion 11 for guiding the electronic card to be received therein. The insulated body 10 has an opening 13 with aligned holes 14 on two opposite walls, and two pivotal holes 15 on two longitudinal sides of the opening 13. Further, a recess 16 is formed near the edge portion 12, and a restraining part 17 is formed between the opening 13 and the edge portion 12.

The elastic terminal 20 is made of a conductive material, and includes a soldering portion 21 and a contact portion 22 with an embowed shape. The terminals 20 are penetrated through each hole 14 to have the soldering portion 21 be extended out the insulated body 10 and the contact portion 22 located in the opening 13.

The seesawing mount 30 is made of a plastic material, and includes two shafts 31 to be located in the corresponding pivotal holes 15. Therefore, the seesawing mount 30 is pivotedly connected to the insulated body 10 in the opening 13. The seesawing mount 30 has a first end 32 and a second end 33. There is an arched recess formed on the second end 33. The second end 33 normally presses on the contact portions 22 of the terminals 20. Further, a stop portion 18 is formed in the opening 13 of the insulated body 10 and right beneath the second end 33. There are a plurality of slots 34 formed on the seesawing mount 30 with respect to the location of the contacting portion 22 of each terminal 20. The second end 33 of the seesawing mount 30 will be lifted to release the contact portions 22 of the terminals 20 with the elasticity up through the slots 34 when the first end 32 of the seesawing mount 30 is pushed down.

The L-shaped resilient element 40 grasped by the restraining part 17 has one end rested in the recess 16 and the other end on the arched recess of the second end 33 of the seesawing mount 30. As such, the second end 33 of the seesawing mount 30 is normally clamped on the stop portion 18 by the resilient element 40, as shown in FIG. 6.

In assembling, there is a frame 19 with a joggle on each corner to join with a corresponding gain on the insulated body 10. The connector is mounted on the PCB by the surface mounting technology (SMT). After the surface of the PCB is coated with the solder and the connector is place thereon, a heating process at a temperature about 180 to 230° C. is provided to adhere the soldering portions 21 of terminals 20 on the PCB.

Figure 5:
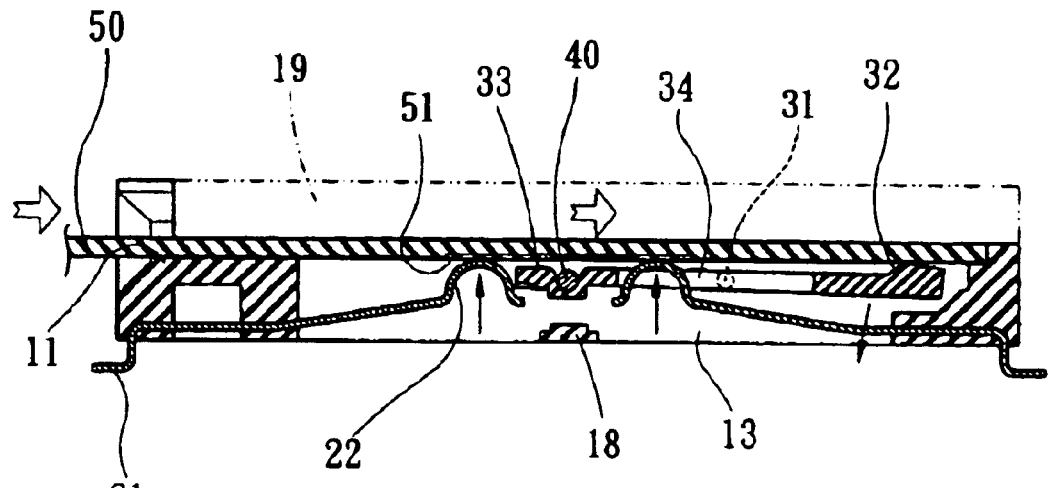
FIG. 5 shows a cross-sectional view of the connector received an electronic card.

Referring to FIG. 5, when an electronic card 40 is received in the slot portion 11 of the insulated body 10, the front end of the electronic card 40 pushes down the first end of the seesawing mount 30 to lift up the second end 33 of the seesawing mount 30. As such, the contact portions 22 of the terminals 20 is connected to the pins 51 of the electronic card 50.

Figure 6:
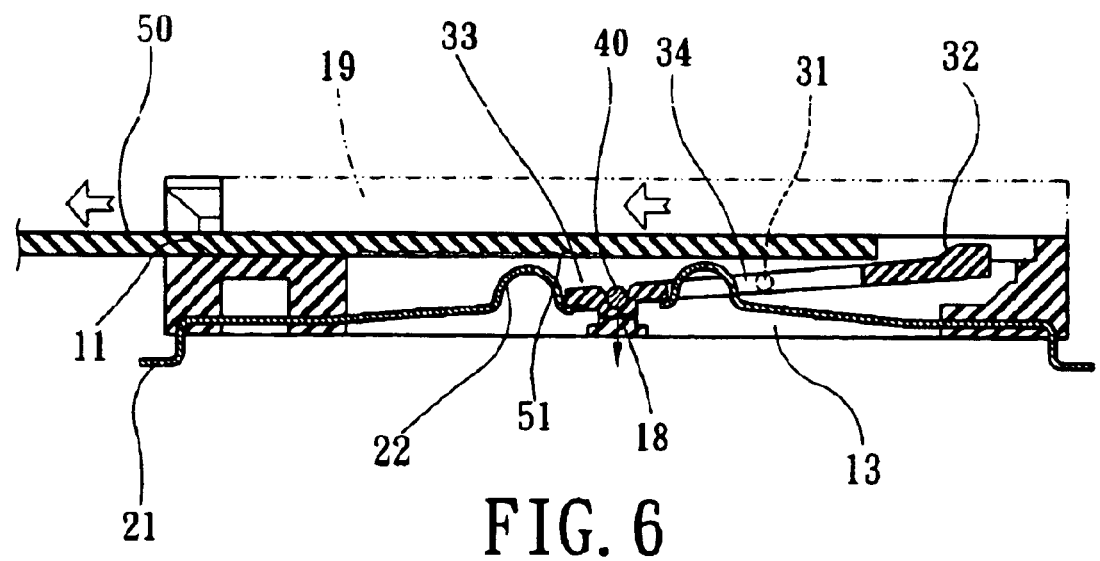
FIG. 6 shows the cross-sectional view of the electronic card removing out of the connector.

Referring to FIG. 6, when taking the electronic card 50 out of the slot portion 11 of the insulated body 10, because the first end 32 of the seesawing mount 30 is free, the resiliency of the element 40 presses the second end 33 of the seesawing mount 30 to clamp on the stop portion 18 again. As such the contact portions 22 of the terminals 20 is pushed down to disconnect with the pins 51 of the electronic card 50.

According to the connector structure of the present invention, it provides at least the advantages as follows.

1. As shown in FIG. 6, only the second end 33 of the seesawing mount 30 is under both the downward force of the resilient element 40 and the upward force of contact portions 22 of the terminals 20. Therefore, the seesawing mount 30 is not easy to get breakdown. Furthermore, the effect of the deformed seesawing mount 30 due to the heating process to mount the connector can be reduced. As such, a reliable contact with the electronic card and a stable connection is provided.

2. A leverage is provided to have a smaller exerting force of the electronic card 50 to push against the first end 32 of the seesawing mount 30. Therefore, the surface of the electronic card 50 is not easy to get attrition.

3. The seesawing mount 30 is integrated to provide a reliably and precisely strengthened structure. Therefore, the yield rate of the connector can be increased and the cost can be reduced.

Other embodiments of the invention will appear to those skilled in the art from consideration of the specification and practice of the invention disclosed herein. It is intended that the specification and examples to be considered as exemplary only, with a true scope and spirit of the invention being indicted by the following claims.

What is claimed is:

1. A connector structure for connecting an electronic card, comprising:

an insulated body having an opening with a plurality of holes formed on at least one wall of the opening;

a plurality of terminals, each having a contact portion for penetrating through a respective hole on the wall into the opening;

a seesawing mount furnished in the opening, having a first end and a second end located above the contact portions of the terminals; and a resilient element having one end mounted on the insulated body and the other end pressing down the second end of the seesawing mount to press down the contact portions of the terminals, whereby when inserting the electronic card in the insulated body, the electronic card pushes down the first end of the seesawing mount to lift up the second end of the seesawing mount so that the contact portions of the terminals can touch the electronic card.

2. The connector structure of claim 1, further comprising a frame to engage with the insulated body above the terminals and the seesawing mount.

3. The connector structure of claim 1, wherein the insulated body includes two pivot holes on two longitudinal sides of the opening, respectively, and the seesawing mount includes two corresponding shafts received in the pivot holes.

4. The connector structure of claim 1, wherein the holes are formed on two opposite walls of the opening.

5. The connector structure of claim 1, wherein the seesawing mount includes a plurality of slots with respect to the locations of the contact portions of the terminals, respectively.

6. The connector structure of claim 1, wherein the second end of the seesawing mount includes and arched recess for locating the other end of the resilient element.

7. The connector structure of claim 1, wherein the insulated body includes a slot portion for receiving the electronic card, and an edge portion around the slot portion for guiding the electronic card to be received therein.

8. The connector structure of claim 7, wherein the insulated body includes a recess near the edge portion for locating the one end of the resilient element, and a restraining part between the recess and the opening for grasping the resilient element.

\* \* \* \* \*